United States Patent [19]

Härtwig et al.

[11] Patent Number: 4,682,756
[45] Date of Patent: Jul. 28, 1987

[54] HYDRAULICALLY OPERATED SELF-CLOSING TWO-WAY SEAT-TYPE VALVE

[75] Inventors: Manfred Härtwig, Ostfildern; Georg Rausch, Lohr, both of Fed. Rep. of Germany

[73] Assignee: Mannesmann Rexroth GmbH, Lohr, Fed. Rep. of Germany

[21] Appl. No.: 886,541

[22] Filed: Jul. 15, 1986

[30] Foreign Application Priority Data

Jul. 16, 1985 [DE] Fed. Rep. of Germany ....... 3525331

[51] Int. Cl.⁴ ........................................... F16K 31/122
[52] U.S. Cl. .............................. 251/63.5; 251/30.05; 251/63.4; 251/282
[58] Field of Search .................... 251/30.05, 63.4, 63.5, 251/282

[56] References Cited

U.S. PATENT DOCUMENTS 3,608,859  9/1971  Hetzer ............................ 251/282 X

FOREIGN PATENT DOCUMENTS 2714410  10/1977  Fed. Rep. of Germany ..... 251/63.4

OTHER PUBLICATIONS

Mannesmann Rexroth Catalog pp. 1–30.

Primary Examiner—Gerald A. Michalsky
Attorney, Agent, or Firm—Michael J. Striker

[57] ABSTRACT

A hydraulically operated two-way seat type valve includes a housing a forming valve seat, and a locking body displaceable in the housing and cooperating with the valve seat. A cover is mounted on the housing. An actuating piston for actuating the locking body of the valve is guided in the cover. The piston has two opposing piston-shaped extensions one of which is secured to the locking body whereby a non self-closing valve can be switching into the self-closing valve.

2 Claims, 3 Drawing Figures

HYDRAULICALLY OPERATED SELF-CLOSING TWO-WAY SEAT-TYPE VALVE

BACKGROUND OF THE INVENTION

The present invention relates to a hydraulic self-closing two-way valve of the type including a housing forming a valve seat and a locking body cooperating with the valve seat and connected to and actuated by an actuating piston which is loaded by pressurized fluid and is displaced in a recess provided in a cover connected to a control block in which the valve is inserted.

Such valves are formed as built-in valves and are accomodated in control blocks in accordance with a lay-out plan PD 81 010/9.84 of the assignee.

In order to provide a self-closing or automatically-closing valve arrangement an additional means is required, which is provided on the actuating piston cooperating with the locking body of the valve; that additional means in the switch-off position of the control valve, in which the control pressure is blocked up to the built-in valve, causes the closing of the locking body of the valve.

In the valves of the foregoing type, the actuating piston is accomodated in the cover and is connected, in the opening direction of the locking body, with that body in a locking fashion by means of coupling elements. Due to the connection of the coupling elements the cover is comparatively large. Therefore specific designs have been required for self-closing two-way seat-type valves, which has been quite expensive.

SUMMARY OF THE INVENTION

It is an object of the present invention to provide an improved self-closing two-way seat-type valve.

It is a further object of the invention to provide a self-closing two-way valve that could be easily adjusted to the housings of non-self closing two-way valves.

These and other objects of the present invention are attained by a hydraulically operated self-closing two-way valve, particularly a built-in valve, comprising a housing having an inner opening and a valve seat at said inner opening; a piston-shaped locking body received in said opening and cooperating with said valve seat and having a guide portion and a seat portion, said guide portion being of greater diameter than that of said seat portion; a cover mounted on said housing and having a recess; a hydraulically loadable actuating piston received in said recess and being operative for actuating said locking body, said actuating piston, being of diameter greater than that of said guide portion said actuating piston having, at a side thereof, which faces away from said closing body, a piston-shaped extension which is guided in said cover and limits in said cover a chamber, said locking body having between said guide portion and said seat portion a ring-shaped surface, said actuating piston having at a side thereof facing away from said locking body, a circular surface, said ring-shaped surface and said circular surface being loaded with a pump pressure, said actuating piston further having at a side thereof facing said locking body a surface which is selectively loadable with a pump pressure or a low pressure, said actuating piston having at the side thereof facing said locking body an additional piston-shaped extension which is connected to said locking body in a locking fashion; a separation wall formed between said piston and said locking body, said additional extension being guided in said separation wall; said additional extension limiting between said locking body and said separation wall and said chamber a further chamber which is loaded with the pressure lower than the pump pressure.

The separation wall may be a part of said cover.

Said piston-shaped extension and said additional extension may be of the same diameter and have a common axial bore also extending through said piston, said additional extension having radial bores connected to said axial bore, said axial bore and said radial bores connecting said further chamber with said chamber.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENT

Figure 1:
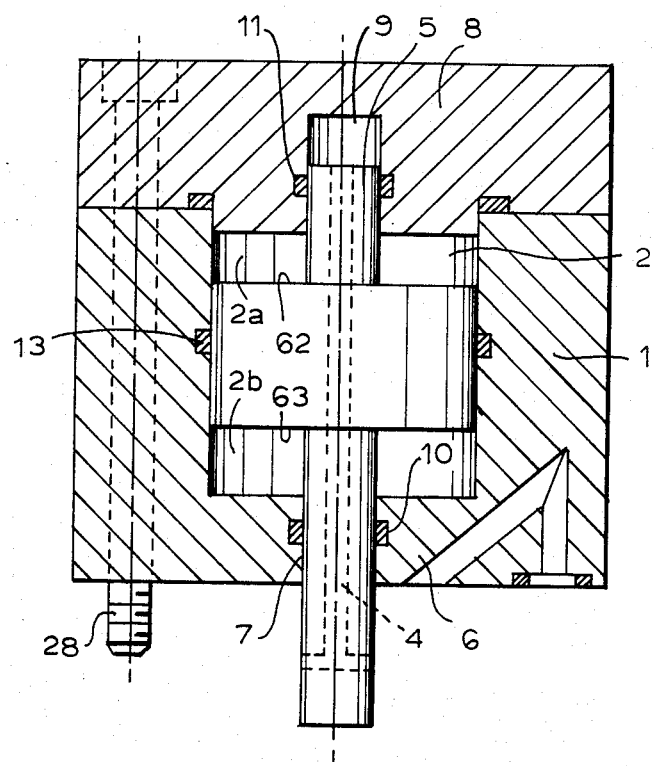
FIG. 1 is a sectional view of the cover with an actuating piston of the valve according to the invention.
Figure 2:
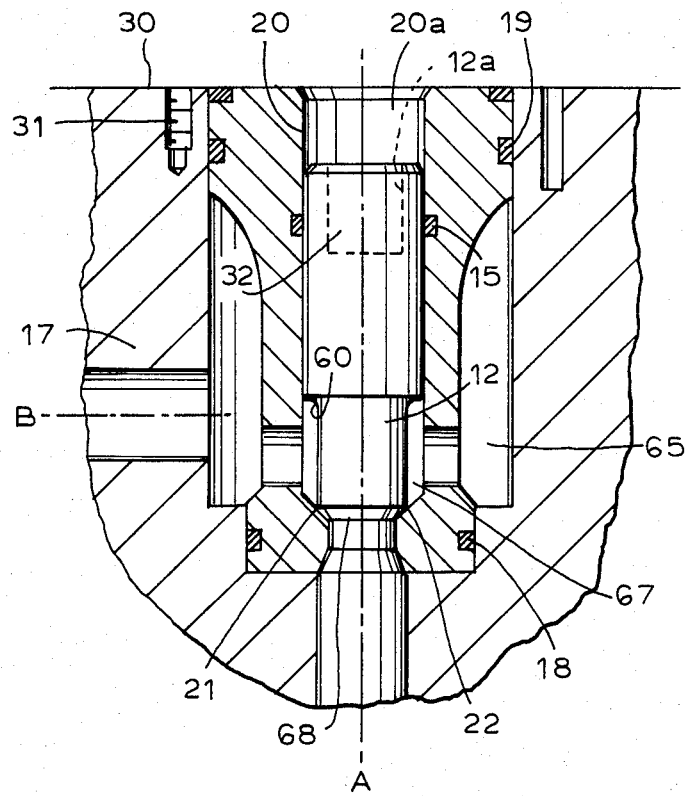
FIG. 2 is a sectional view of the sleeve-shaped housing with the locking body of the valve in the inserted position in the control block.

Referring now to the drawings in detail, and firstly to FIGS. 1 and 2 thereof, it will be seen that reference numeral 1 designates a cover which is provided with a recess 2 which receives an actuating piston 3 with two opposing piston rod-shaped extensions 4 and 5. The recess 2 is limited in the direction of extension 4 by a separating wall 6 of the cover. An axial bore 7 is provided in that separation wall, through which extension 4 protrudes. This recess 2 is limited in the direction of extension 5 by means of a plate 8 which has a pocket bore 9 for guiding the extension 5. Sealing O-rings 10, 11 prevent overflow of the control fluid in the recess 2 in the direction of the pocket bore 2 or in the direction of a locking or closing body 12. The actuating piston 3 is also fluid-tight guided in recess 2 through a seal ring 13 so that no overflow of the control fluid would occur via piston 3 in the recess 2 in a region 2a or a region 2b.

As shown in FIG. 2, a sleeve-shaped housing 15 is fluid-tight inserted, by means of sealing rings 18 and 19, in a recess 16 of a control block 17 shown in section. The locking body 12 of the valve is guided in an axial bore 20 of the sleeve-shaped housing 15 and cooperates with a valve seat 22 formed on the sleeve 15. In the illustrated closing position the connection from B to A is interrupted.

Figure 3:
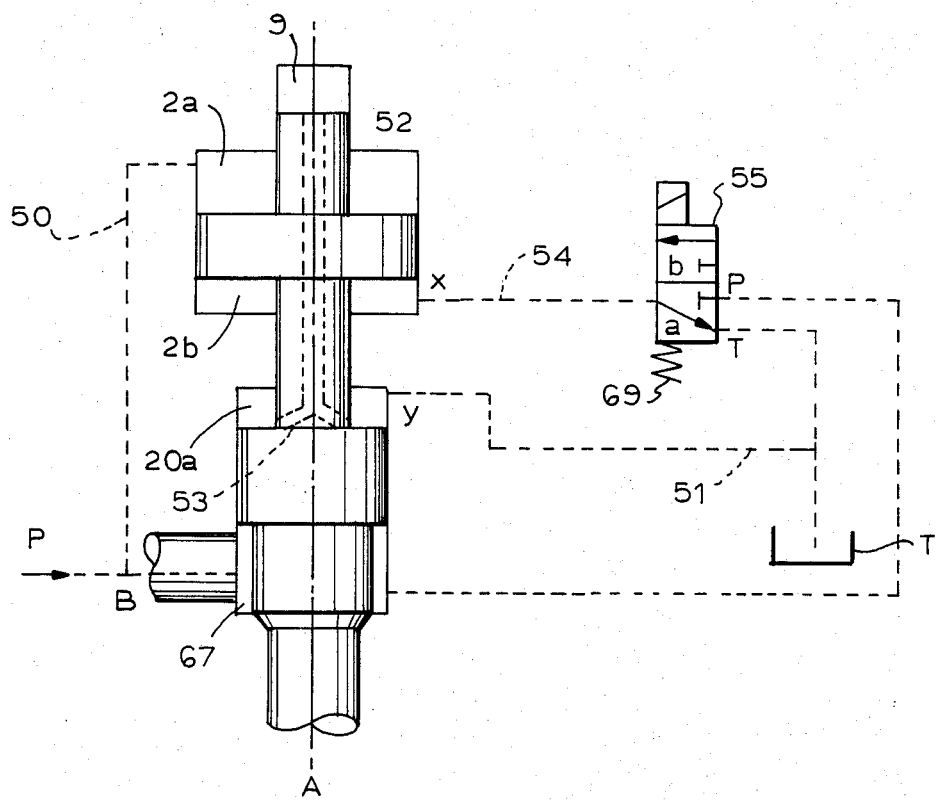
FIG. 3 is a block diagram of the hydraulically operated device according to the invention.

Cover 1 is secured at a receiving plane 30 of the control block 17 by means of bolts 28 (FIG. 1). By this connection of the cover sleeve 15 becomes at the same time, fixed in the axial direction. Extension 4 of the actuating piston 3 becomes engaged, upon the assembly of cover 1 with sleeve 15, in a pocket bore 32 of the locking body 12 and is in a form-locking connection, during operation, with the locking body 12 via that pocket bore. The assembled position of the cover with the sleeve-shaped housing and the locking body of the valve is shown in FIG. 3.

The mode of operation of the valve according to the invention will be explained below with reference to FIG. 3.

A working fluid flows from a pump conduit P to the connection B of the valve and from hence into an annular chamber 67. At the same time, region 2a of the recess 2 of the cover 1 is under pump pressure via a control conduit 50. A control chamber 20a is in turn in connection with a tank T through a connection Y and a control conduit 51. The recess or chamber 9 is in connection, via bores 52, 53 in extensions 4, 5 and piston 3, with the control chamber 20a and also in connection with tank T via the control conduit 51. Region 2b of the recess 2 receiving the piston 3 is loaded via a control connection X and control conduit 54, for example by means of a magnetically-actuated three-way two position valve 55 either with the tank pressure or with the pump pressure. In the illustrated closing position "a" of the magnetically actuated valve 55, region 2b is connected at two switch positions a, b with the tank. Inasmuch as the region 2a is continually under the pump pressure and the size of the pressure-loaded annular surface 62 of the actuating piston 3 is greater than the sum of the ring-shaped surface 60 and the consumer pressure-loaded circular surface 68 of the locking body and the seat 21, it is ensured that the actuating piston 3 tightly pushes, via extension 4, the locking body 12 with its seat region 21 against the seat 22 of the sleeve-shaped housing 15.

If the magnetically actuated valve 55 is displaced from its illustrated switch position "a" to the switch position "b", upon the actuating of a magnet in a conventional manner the region 2b of recess 2 is then loaded with the pressure of the pressure fluid source P. Since piston extensions 4, 5 are of the same diameter the actuating piston 3 is pressure-compensated. Thereby the locking body 12 is displaced via the pump pressure-loaded circular surface 60 and the consumer pressure-loaded surface 68 in the opening direction and the connection B as well as the valve chamber 67 become connected via chamber 65, passages 66 in the sleeve 15, to the connection A which leads to a consumer.

The locking body 12 is again moved to its locking position when the magnetically actuated switch valve 55 takes its shown switch-off position "a" for example also upon a fall-out of the flow, by means of a spring 69, in which position the region 2b of the recess 2 is in connection with tank T.

By the pump pressure exerted in the piston chamber region 2a, the actuating piston 3 is loaded in the closing direction so that the piston is again displaced to its closing position. In case of a flow fall-out the valve closes automatically.

As shown in FIGS. 1 and 3 both extensions 4 and 5 have axial bores 52 which are coaxial. Extension 4 has radially extended bores 53 which can be oblique as shown in FIG. 3. Radial bores 53 merge into axial bore 52. Axial bore 52 also extends through piston 3.

It will be understood that each of the elements described above, or two or more together, may also find a useful application in other types of hydraulically operated self-closing two-way valves differing from the types described above.

While the invention has been illustrated and described as embodied in a hydraulically operated self-closing seat-type valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. In a hydraulically operated self-closing two-way valve, particularly a built-in valve, comprising a housing (15) having an inner opening and a valve seat at said inner opening; a piston-shaped loacking body (12) received in said opening and cooperating with said valve seat and having a guide portion (12a) and a seat portion (21), said guide portion being of greater diameter than that of said seat portion; a cover (1) mounted on said housing and having a recess; a hydraulically loadable actuating piston (3) received in said recess and being operative for actuating said locking body, said actuating piston being of diameter greater than that of said guide portion (12a), said actuating piston having, at a side thereof which faces away from said closing body, a piston-shaped extension (5) which is guided in said cover and limits in said cover a chamber (9), said locking body having between said guide portion and said seat portion a ring-shaped surface (60), said actuating piston having at a side thereof facing away from said locking body, a circular surface (62), said ring-shaped surface and said circular surface being loaded with a pump pressure, said actuating piston further having at a side thereof facing said locking body a surface (63) which is selectively loadable with a pump pressure or a low pressure, the improvement comprising:
  (a) said actuating piston having at the side thereof facing said locking body an additional piston-shaped extension (4) which is connected to said locking body in a locking fashion;
  (b) a separation wall (6) formed between said piston and said locking body, said additional extension being guided in said separation wall;
  (c) said additional extension limiting between said locking body and said separation wall and said chamber (9) a further chamber (20a) which is loaded with the pressure lower than the pump pressure;
  (d) said piston-shaped extension and said additional extension being of the same diameter and having a common axial bore (52) also extending through said piston; and
  (e) said additional extension having radial bores (53) connected to said axial bore while said axial bore and said radial bores connect said further chamber (20a) with said chamber (9).

2. The valve as defined in claim 1, wherein said separation wall is a part of said cover.

* * * * *